United States Patent
Forrest et al.

(10) Patent No.: US 10,965,243 B2
(45) Date of Patent: Mar. 30, 2021

(54) SOLAR TRACKING SYSTEM

(71) Applicant: The Regents of the University of Michgian, Ann Arbor, MI (US)

(72) Inventors: Stephen R. Forrest, Ann Arbor, MI (US); Kyusang Lee, Ann Arbor, MI (US); Boning Qu, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 0 days.

(21) Appl. No.: 15/765,924

(22) PCT Filed: Oct. 5, 2016

(86) PCT No.: PCT/US2016/055473
§ 371 (c)(1),
(2) Date: Apr. 4, 2018

(87) PCT Pub. No.: WO2017/062440
PCT Pub. Date: Apr. 13, 2017

(65) Prior Publication Data
US 2018/0294767 A1    Oct. 11, 2018

Related U.S. Application Data

(60) Provisional application No. 62/237,412, filed on Oct. 5, 2015.

(51) Int. Cl.
*H02S 20/32* (2014.01)
*F24S 23/74* (2018.01)
(Continued)

(52) U.S. Cl.
CPC ............. *H02S 20/32* (2014.12); *F24S 23/74* (2018.05); *F24S 30/425* (2018.05); *F24S 30/20* (2018.05);
(Continued)

(58) Field of Classification Search
CPC ......... H02S 20/32; F24S 30/425; F24S 23/74; F24S 2020/16; F24S 30/20;
(Continued)

(56) References Cited

U.S. PATENT DOCUMENTS 4,109,638 A    8/1978   Matlock
4,137,897 A *  2/1979   Moore .................... F24S 50/20
                                                        126/605
(Continued)

FOREIGN PATENT DOCUMENTS

CN           101010545 A      8/2007
DE       20 2014 105615 U1    1/2015
(Continued)

OTHER PUBLICATIONS

International Search Report & Written Opinion dated Dec. 20, 2016, PCT/US2016/055473.
(Continued)

*Primary Examiner* — Michael Y Sun
(74) *Attorney, Agent, or Firm* — Lempia Summerfield Katz LLC

(57) ABSTRACT

A solar tracking system for tracking the orientation of solar energy is disclosed. The solar tracking system may be integrated with solar cells and solar concentrators. The solar tracking system may have a first (22) and second (24) tracker module array that are opposite from another, aligned in substantially identical orientation, and form a tracker module pair array (1000). Tracker module pairs (12, 14; 12, 144) may allow motion relative to one another while maintaining substantially identical orientation. Solar concentrators may be attached to opposing tracker modules of a tracker module pair forming an array of solar concentrators. A base bar array (28) may be coupled to at least one tracker module pair. A
(Continued)

transmission may operably rotate the base bar array and the tracker module pair array simultaneously.

23 Claims, 13 Drawing Sheets

(51) Int. Cl.
| | |
|---|---|
| *F24S 30/425* | (2018.01) |
| *F24S 30/00* | (2018.01) |
| *F24S 25/60* | (2018.01) |
| *F24S 23/70* | (2018.01) |
| *F24S 30/20* | (2018.01) |
| *F24S 20/00* | (2018.01) |
| *F24S 50/20* | (2018.01) |
| *F24S 30/428* | (2018.01) |
| *F24S 30/452* | (2018.01) |
| *F24S 30/455* | (2018.01) |
| *F24S 30/458* | (2018.01) |
| *F24S 30/48* | (2018.01) |

(52) U.S. Cl.
CPC .......... *F24S 30/428* (2018.05); *F24S 30/452* (2018.05); *F24S 30/455* (2018.05); *F24S 30/458* (2018.05); *F24S 30/48* (2018.05); *F24S 50/20* (2018.05); *F24S 2020/16* (2018.05); *F24S 2023/872* (2018.05); *F24S 2025/6007* (2018.05); *F24S 2030/12* (2018.05); *F24S 2030/13* (2018.05); *F24S 2030/131* (2018.05); *F24S 2030/134* (2018.05); *F24S 2030/14* (2018.05); *F24S 2030/145* (2018.05); *Y02E 10/40* (2013.01); *Y02E 10/47* (2013.01)

(58) Field of Classification Search
CPC ............ F24S 2030/14; F24S 2023/872; F24S 2025/6007; F24S 2030/134; F24S 2030/12; F24S 30/428; F24S 30/452; F24S 30/455; F24S 30/458; F24S 30/48; F24S 50/20; F24S 2030/131; F24S 2030/145; F24S 2030/13; Y02E 10/47; Y02E 10/45; Y02E 10/40; Y02E 10/50

See application file for complete search history.

(56) References Cited

U.S. PATENT DOCUMENTS

| | | | |
|---|---|---|---|
| 7,192,146 B2 * | 3/2007 | Gross | F24S 50/20 359/853 |
| 2006/0086382 A1 * | 4/2006 | Plaisted | F24S 25/636 136/244 |
| 2010/0126554 A1 * | 5/2010 | Morgan | H01L 31/042 136/246 |
| 2010/0252026 A1 | 10/2010 | Schilling et al. | |
| 2011/0073104 A1 * | 3/2011 | Dopp | F24S 25/00 126/651 |
| 2014/0076480 A1 | 3/2014 | Kalus | |
| 2014/0166077 A1 * | 6/2014 | Gupta | F24S 50/20 136/246 |
| 2017/0317641 A1 | 11/2017 | Rainer | |

FOREIGN PATENT DOCUMENTS

| | | |
|---|---|---|
| FR | 3 014 925 A1 | 6/2015 |
| WO | 2008115305 A2 | 9/2008 |
| WO | WO 2009/112026 A1 | 9/2009 |
| WO | WO 2010/102619 A2 | 9/2010 |
| WO | WO 2011/094803 A1 | 8/2011 |

OTHER PUBLICATIONS

Office Action in Taiwan Patent Application No. 105132273, dated Aug. 25, 2020, 16 pages (including English translation).
Examination Report in European Patent Application No. 16 784 342.4, dated Mar. 13, 2020, 11 pages.
Search Report in Taiwan Patent Application No. 105132273, dated Aug. 13, 2020, 2 pages (including English translation).
Office Action in Taiwan Patent Application No. 105132273, dated Aug. 25, 2020, 30 pages (including machine translation).

* cited by examiner

18

11

11

11

SOLAR TRACKING SYSTEM

This application claims priority to U.S. Provisional Application No. 62/237,412, filed Oct. 5, 2015, which is incorporated herein by reference in its entirety.

The subject matter of the present disclosure was made by, on behalf of, and/or in connection with one or more of the following parties to a joint university-corporation research agreement: The Regents of the University of Michigan and NanoFlex Power Corporation. The agreement was in effect on and before the date the subject matter of the present disclosure was prepared, and was made as a result of activities undertaken within the scope of the agreement.

The present disclosure generally relates to solar tracking systems, and particularly, to a planar solar tracking system and concentrators.

Cost-effective solar to electrical power conversion is one of the key issues for photovoltaic technology. Tracking the motion of the sun throughout the day and seasons can reduce the cost per Watt of solar cells by eliminating the cosine loss due to the oblique incident angle of solar flux. Further, concentrating the suns energy at discrete locations may be advantageous as fewer solar cells are required to generate the same electrical advantage as a solar array without the added benefit of concentration. In select applications, such as rooftops, tracking the motion of the sun may be difficult as it often requires expensive, bulky equipment, that is too heavy to be supported by a typical roof, occupies too large of a footprint to be practical, or may even be wholly incapable of adjusting with the motion of the sun.

The present disclosure addresses one or more of the problems set forth above and/or other problems associated with conventional solar tracking systems and solar concentrators.

The disclosed embodiments relate to a solar tracking system. The solar tracking system may have a first and second tracker module array that are opposite from another, aligned in substantially identical orientation, and form a tracker module pair array. Solar concentrators may be attached to opposing tracker modules of a tracker module pair thereby forming an array of solar concentrators. A base bar array may be coupled to at least one tracker module pair. A transmission may operably rotate the base bar array and the tracker module pair array.

In one embodiment, a solar tracking system comprises a first tracker module array and a second tracker module array wherein the first tracker module array and second tracker module array are opposite one another, aligned in substantially identical orientation, and form a tracker module pair array comprising a plurality of interlinked tracker module pairs; a plurality of solar concentrators wherein at least one solar concentrator is attached to and disposed between at least one tracker module pair; a base bar array coupled to one of the tracker module arrays wherein the base bar array comprises a plurality of interlinked base bars; and a transmission coupled to the base bar array and one of the tracker module arrays.

In one embodiment, a solar tracking system comprises a tracker module pair array comprising a plurality of interlinked tracker module pairs, wherein at least one tracker module pair has a dowel with a fixed end attached to it and a free end opposite the fixed end, and wherein each tracker module pair is in contact with at least one adjacent tracker module pair by a plurality of fitment features, wherein the fitment features maintain tracker module pairs at substantially identical orientation, and wherein the fitment features allow adjacent tracker module pairs to move relative to one another; an array of parabolic concentrators wherein each parabolic concentrator is disposed between a tracker module pair; a base bar array comprising a plurality of interlinked base bars, at least one circumscribing void, and wherein a free end of the dowel is enveloped by the at least one circumscribing void; and a transmission, operably coupled to the base bar array and the tracker module pair array.

In one embodiment, a solar tracking system comprises a row of first tracker modules and a row of second tracker modules, wherein successive tracker modules of the row of first tracker modules and successive tracker modules of the row of second tracker modules form an array of tracker module pairs, wherein each tracker module pair is in contact with at least one adjacent tracker module pair by a plurality of fitment features, and wherein the fitment features maintain the tracker module pairs at substantially identical orientation; an array of solar concentrators wherein each concentrator is disposed between a tracker module pair; a base bar array; and a transmission with at least two gearsets, operably coupled to the base bar array and at least one tracker module.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

Reference will now be made in detail to the disclosed embodiments, examples of which are illustrated in the accompanying drawings. Wherever convenient, the same reference numbers will be used throughout the drawings to refer to the same or like parts. However, a species of a genus may be referred to by the same reference number of the genus when describing the species in further detail.

Figure 1:
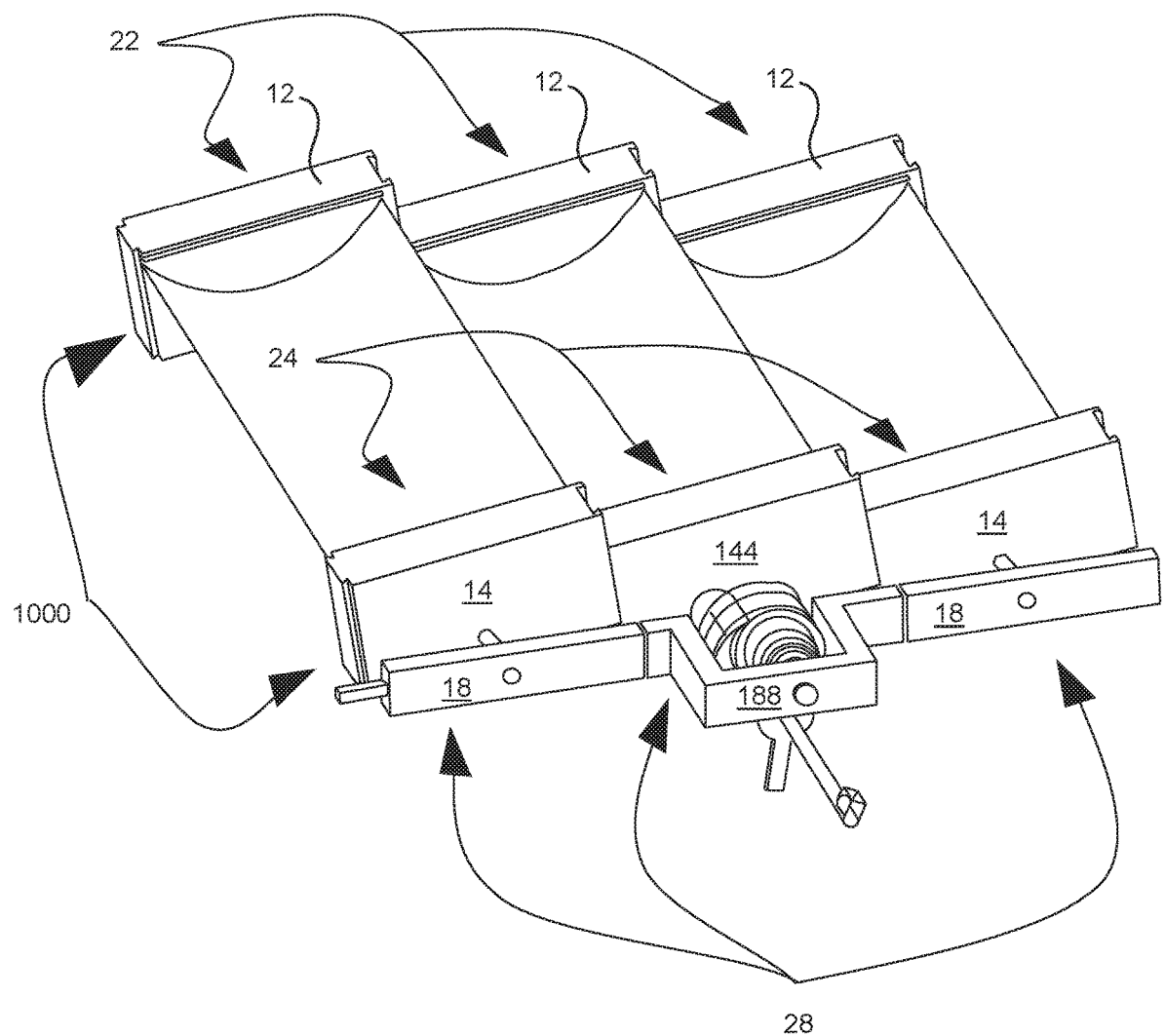
FIG. 1 is a profile view of a solar tracking system, consistent with disclosed embodiments.

FIG. 1 is a profile view of a solar tracking system. The exemplary solar tracking system 10 has tracker modules 12, 14, and 144. The first row of three tracker modules 12 forms a first tracker module array 22. As illustrated, the second row of two tracker modules 14 and power tracker module 144 form a second tracker module array 24. The first and second tracker module arrays 22, 24 may form a tracker module pair array 1000.

In the exemplary embodiment of FIG. 1, three tracker module pairs are illustrated. In other embodiments, for example, additional tracker module pairs may be used as explained herein. An interior centralized tracker module pair (tracker module 12 and powered tracker module 144) is illustrated between a left tracker module pair and a right tracker module pair. As illustrated, left tracker module pair (tracker modules 12 and 14) and right tracker module pair (tracker modules 12 and 14) make contact with and are on opposing sides of the interior centralized tracker module pair (tracker module 12 and powered tracker module 144). Solar concentrators 16 may be attached between tracker module pairs. Moreover, solar concentrators 16 may be parabolic and channel the solar energy into solar cells oriented along the focal plane of the solar concentrator 16.

As illustrated in FIG. 1, two base bars 18 and powered base bar 188 together form a base bar array 28. In other embodiments, for example, additional base bars may be used as explained herein. Exemplary powered base bar 188 has a "C" like shape and base bar 18 has a linear straight line shape. However, in other embodiments powered base bar 188 may have a different shape, such as a linear shape. Moreover, base bar array 28 is operably attached to the second tracker module array 24. The operable attachment may assist with allowing the base bar array 28, the first tracker module array 22, and the second tracker module array 24 to rotate in concert.

Figure 1A:
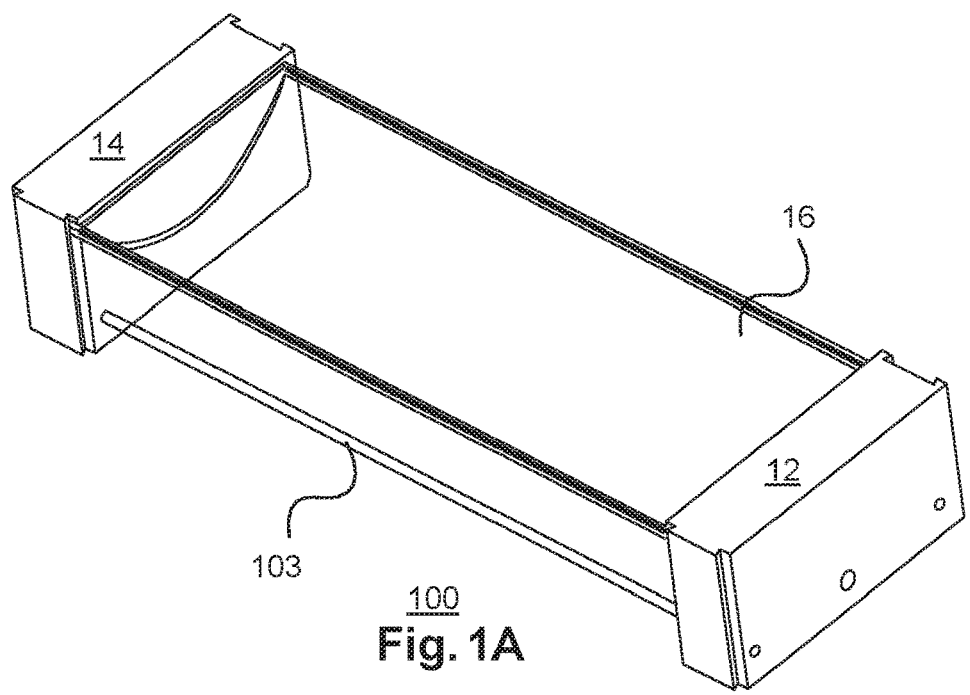
FIG. 1A-1B are profile views of a tracker module pair, consistent with disclosed embodiments.

Referring now to FIG. 1A, is a profile view of a tracker module pair of a solar tracking system. The tracker module pair 100 has a first tracker module 12 and a second tracker module 14. The first and second tracker modules 12, 14 may be structurally attached to one another by a linking rod 103 or multiple linking rods 103 or by other attaching structures. The linking rod(s) 103 maintain the relative position and the same orientation of tracker modules 14 and 12. In at least one preferred embodiment two linking rods 103 are used.

A parabolic solar concentrator 16 is disposed between the first and second tracker modules 12 and 14. In alternate embodiments, the solar concentrator 16 may be planar or consist of multiple parabolic concentrator cells or other types of concentrators and or lenses as would be understood by a person having ordinary skill in the art of solar concentrators and optics.

Figure 1B:
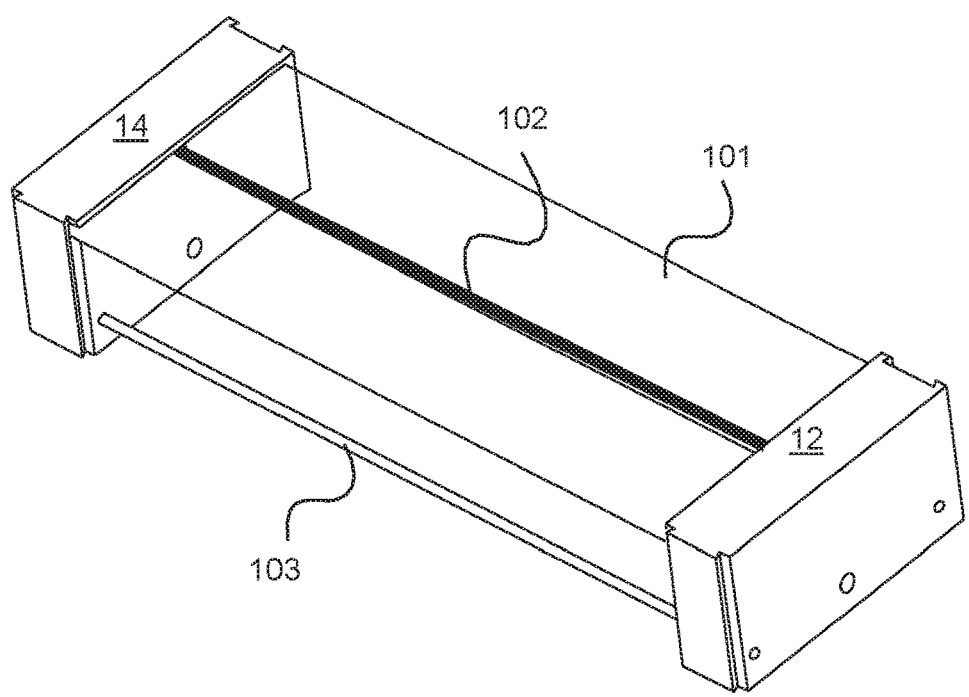

Referring now to FIG. 1B, is a profile view of a tracker module pair 100 of a solar tracking system. The tracker module pair 100 is illustrated without the parabolic concentrator 16 (see FIG. 1A) for ease of understanding of the above transparent elements. A film like solar cell 102 is aligned along a transparent glass shield 101 to be coincident to the focal plane of the solar concentrator 16 (see FIG. 1A). The solar absorption side of the solar cell 102 faces towards the concentrator surface. In the exemplary embodiment of FIG. 1B the focal plane is a linear line along the center of the glass shield 101. In other embodiments, the focal plane and solar cell 102 may be aligned elsewhere, such as along an edge. Further, multiple focal planes, points, and solar cells may be present in a single tracker module pair 100.

Figure 2:
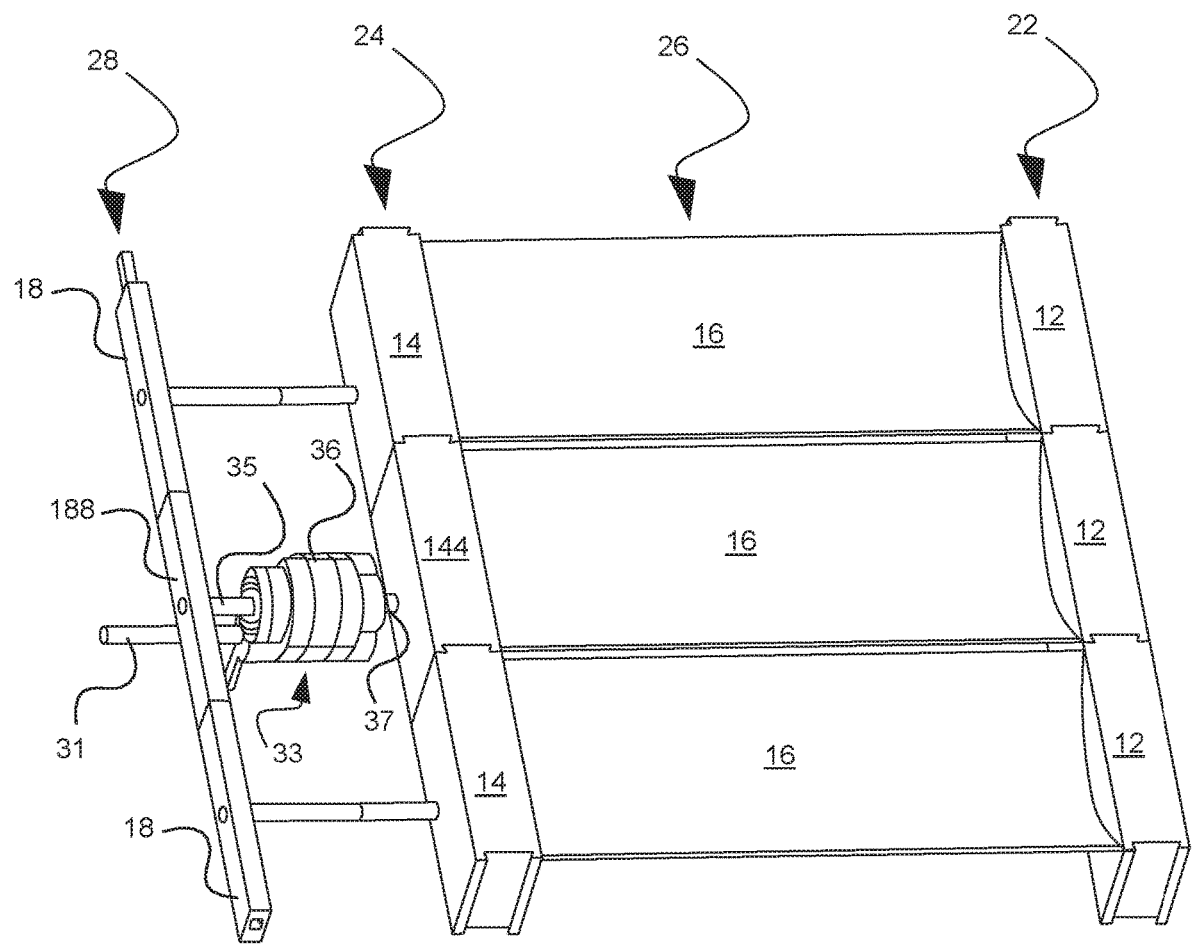
FIG. 2 is a profile view of another solar tracking system, consistent with disclosed embodiments.

Referring now to FIG. 2, is a profile view of another solar tracking system 11 with a linear straight line powered base bar 188. The base bars 18 and 188 form a base bar array 28 with a linear straight line shape. As illustrated, the rows of solar concentrators 16 form a solar concentrator array 26. Solar concentrators may concentrate the solar flux outward, inward, or in any feasible orientation as would be understood by a person having ordinary skill in the art. The first tracker module array 22 may be spaced apart from the second tracker module array 24 by a distance equal to the major axis of a solar concentrator 16. The solar concentrator 16 may, at least partially, couple the respective trackers of the first tracker module array 22 to the respective trackers of the second tracker module array 24. In other embodiments the respective trackers may be coupled together by an undercarriage system of bars and linking elements thereby eliminating structural stress on the solar concentrator 16.

As illustrated in FIG. 2, the solar tracking system 11 has a transmission 33 between the second tracker module array 24 and the base bar array 28. The transmission has a power input shaft 31 that drives the internal workings of the transmission 33. The transmission 33 may receive rotational power by way of the power input shaft 31 being operably coupled to a motor. The motor may be, for example, a stepper motor although those with skill in the art will appreciate that rotational power may come from numerous sources. The transmission may distribute the received rotational power to the powered tracker module output shaft 37 and the powered base bar output shaft 35. The powered tracker module 144 may be fixedly attached to the powered tracker module output shaft 37. Likewise, the powered base bar 188 may be fixedly attached to the powered base bar output shaft 35.

In exemplary FIG. 2, rotational power may enter the solar tracking system 11 by way of the power input shaft 31. The inner workings of transmission 33 are not visible as the transmission outer covering 36 obscures the interior workings of transmission 33. The transmission 33, may distribute rotational power to the powered tracker module 144 and the powered base bar 188. In turn, the powered tracker module 144 and the powered base bar 188 may distribute rotational power throughout the solar tracking system 11. For example, the powered tracker module 144 may push and pull on adjacent tracker modules thereby causing the first and second tracker module arrays 22, 24 to rotate. Similarly, the powered base bar 188 may push and pull against adjacent base bars 18 thereby causing the base bar array 28 to rotate.

Figure 3A:
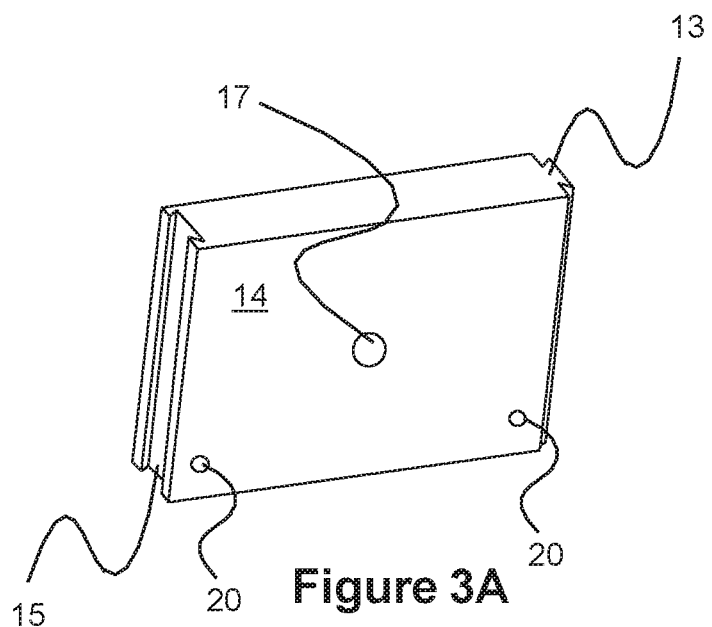
FIG. 3A is a profile view illustration of a tracker module of a solar tracking system, consistent with disclosed embodiments.
Figure 3B:
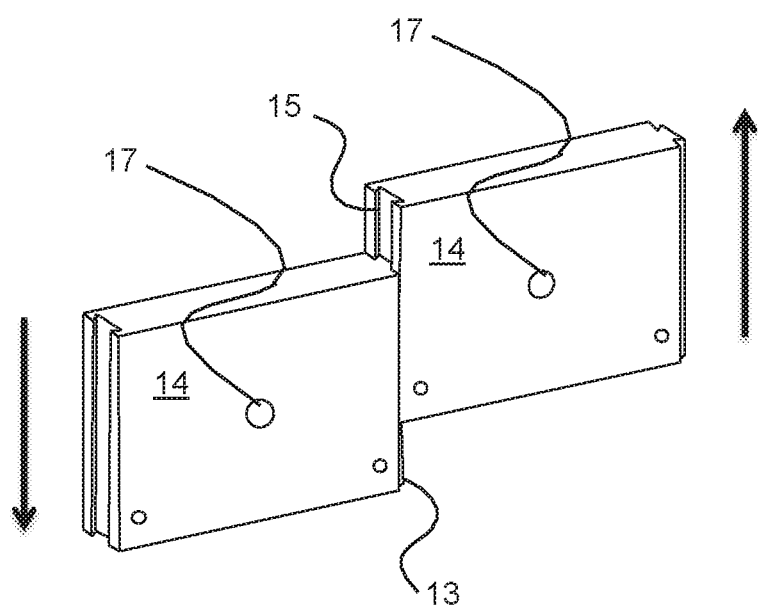
FIG. 3B is a profile view illustration of a tracker module array of a solar tracking system, consistent with disclosed embodiments.

Referring now to FIGS. 3A and 3B, a tracker module 14 and an interaction between adjacent tracker modules 14 is illustrated. The tracker module 14 of FIG. 3A has a dowel receptor 17 and connection points 20. In at least one, preferred embodiment dowel receptor 17 may be in the centermost position of the tracker module 14.

Additionally, in at least one preferred embodiment, connection points 20 may be symmetrically oriented to ensure a symmetric structural linking and force distribution. Furthermore, connection points 20 may be below the solar concentrator 16 in order to prevent blocking sunlight. Further, connection points 20 may be specifically designed for accommodating long linking rods.

In other embodiments, connection points 20 may be located anywhere along the face of the tracker module 14. The connection points 20 may be used to attach solar cells, solar concentrators, an undercarriage support system, or other elements as would be appropriate for a solar tracking system. For example, an undercarriage support system may couple opposite tracker modules thereby forming a tracker module pair. An undercarriage support system may consist of linking rods (see 103 of FIG. 1A). However, in at least one preferred embodiment, concentrators and solar cells, are fixed by other complex-shaped hollow slits as may be illustrated by FIG. 1A and FIG. 1B.

As illustrated, the tracker module 14 has a protruding fitment feature 13 and a receiving fitment feature 15. In other embodiments the tracker module 14 may have other fitment features such as a tongue and groove, track and rail, or channel and lock as would be understood by a person having ordinary skill in the art.

In exemplary FIG. 3B, the operability of the fitment features 13 and 15 is illustrated. The protruding fitment feature 13 is partially enclosed by the receiving fitment feature 15. The fitment features 13 and 15 may be shaped in any desirable shape such that the protruding fitment feature 13 and the receiving fitment feature 15 operably slide in a direction parallel to the fitment features 13 and 15 but do not allow motion (at least significant motion) in a perpendicular direction to the fitment features 13 and 15. The arrows of FIG. 3B illustrate how fitment features 13 and 15 of tracker modules 14 move in a parallel direction to the fitment features 13 and 15, but do not allow motion in a perpendicular direction to the fitment features 13 and 15.

Moreover, the fitment features allow for opposing motion of respective tracker modules 14 in relation to one another. As each individual tracker module 14 has fitment features 13 and 15 it is readily apparent that additional tracker modules 14 may be easily added to an adjacent tracker module 14. Therefore, the fitment features 13 and 15 also facilitate customization of a solar tracking system allowing any number of tracker modules 14 to be utilized in sequence.

In other exemplary embodiments, fitment features 13 and 15 may have end plugs (not illustrated) that prevent the tracker modules 14 from separation. This may be achieved by preventing a range of motion in excess of the major axis of fitment features 13 and 15. In at least one embodiment, end plugs are not necessary as the range of motion of the tracker modules 14 cannot exceed the length of the fitment features 13 and 15.

Figure 4A:
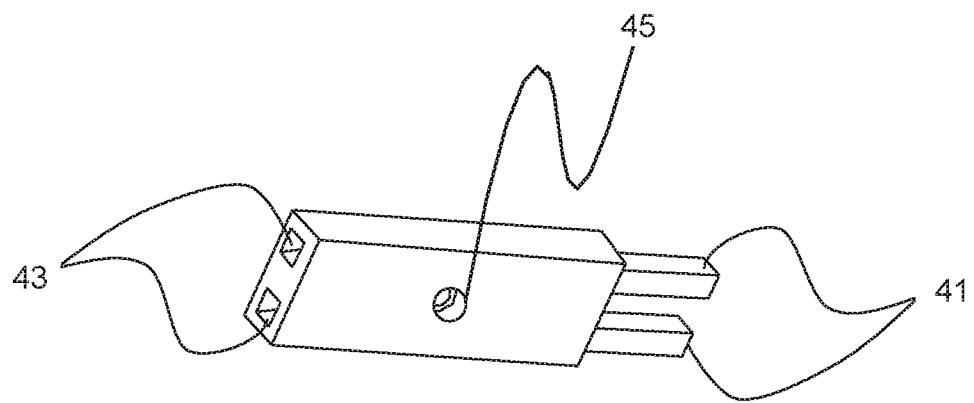
FIG. 4A is a profile view illustration of a base bar of a solar tracking system, consistent with disclosed embodiments.
Figure 4B:
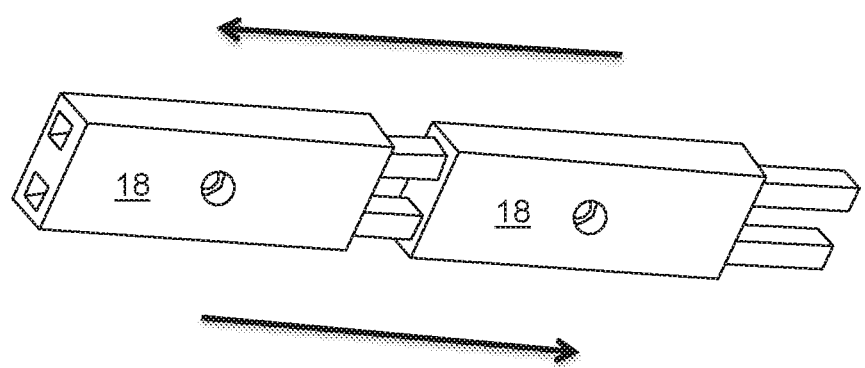
FIG. 4B is a profile view illustration of a base bar array of a solar tracking system, consistent with disclosed embodiments.

Referring now to FIG. 4A and FIG. 4B, a base bar 18 and an interaction between adjacent base bars 18 is illustrated. The base bar 18 of FIG. 4A has a circumscribing void 45. Circumscribing void 45 may be a contiguous void through the entirety of the base bar 18 or it may be a partial void. In other embodiments. Base bar 18 may have a pair of protruding fitment features 41 and a pair of receiving fitment features 43. In other embodiments, base bar 18 protruding fitment feature(s) 41 may be a single fitment feature and a corresponding single recessed fitment feature. In this way, protruding fitment features 41 and receiving fitment features 43 are operably sized to protrude into and be received by one another.

Individuals with ordinary skill in the manufacturing arts will appreciate that any cross sectional shape is possible so long as the fitment features 41 and 43 are sized in relation to one another. Furthermore, those with skill in the art will appreciate that any number of fitment features are possible such that at least one fitment feature is utilized. For example, protruding fitment feature 41 and receiving fitment feature 43 may have any cross sectional shape, such as square, triangular, hexagonal, or circular and in any number. Further still, in at least one preferred embodiment fitment features may be designed to reduce the cost, surface area, and frictional coefficient.

In exemplary FIG. 4B, the operability of the base bars 18 is shown. The protruding fitment features 41 are partially enclosed by the receiving fitment features 43 where the base bars 18 make contact. As illustrated, receiving fitment features 43 are a square cross sectional void with a depth substantially equal to the length of the protruding fitment features 41. The arrows of FIG. 4B illustrate how base bars 18 move in a parallel direction to the fitment features 41 and 43, but do not allow motion in a perpendicular direction to the fitment features 41 and 43. Moreover, the fitment features 41 and 43 allow for opposing motion of respective base bars 18 in relation to one another. As each individual base bar 18 has fitment features 41 and 43 it is readily apparent that additional base bars 18 may be easily added to an adjacent base bar 18. Therefore, the fitment features 41 and 43 also facilitate customization of a solar tracking system allowing any number of base bars 18 to be utilized in sequence.

Fitment features 41 and 43 may have end plugs (not illustrated) that prevent the base bars 18 from separation. This may be achieved by preventing a range of motion in excess of the length of the protruding fitment feature(s) 41. In at least one embodiment end plugs are not necessary as the range of motion cannot exceed the length of the fitment features 41 and 43.

Figure 5A:
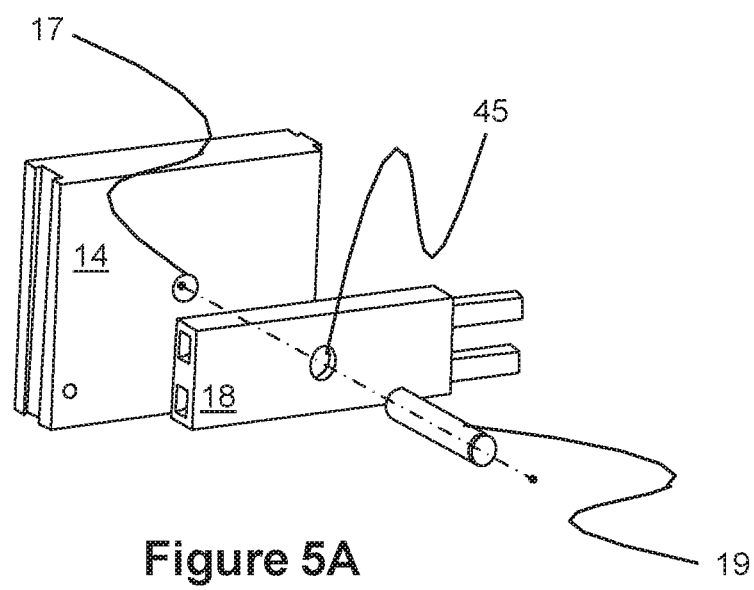
FIG. 5A is an exploded-view illustration of a tracker module and base bar assembly, consistent with disclosed embodiments.

Referring now to FIG. 5A is an exploded-view illustration of a tracker module 14, dowel 19, and base bar 18 relationship. The broken line illustrates the projection of the dowel 19 through the circumscribing void 45 and into the dowel receptor 17. It is important to note that FIG. 5A is not illustrative of a range of motion, but rather of the relationship of the dowel 19 to the exemplary tracker module 14 and exemplary base bar 18. The dowel 19 may penetrate the base bar 18 through a circumscribing void 45 and fixedly couple to the dowel receptor 17. The circumscribing void 45 is not fixedly attached to the dowel 19, but rather circumscribes the dowel 19 and is sized to envelop the dowel 19 with insubstantial excess void space. In an alternate embodiment, the circumscribing void 45 may consist of a water tight seal and bearing allowing for smooth rotation and resiliency as may be required for extreme applications.

The circumscribing void 45 allows the dowel 19 to freely rotate within the interior of circumscribing void 45 with insubstantial resistance. Moreover, the sidewalls of the circumscribing void 45 allow lateral forces to be distributed between the tracker module 14 and base bar 18 by way of the dowel and the interior sidewalls of the circumscribing void 45. Further, rotational forces are not transferred from base bar 18 to tracker module 14 because the dowel is freely circumscribed by the circumscribing void.

Individuals with ordinary skill in the manufacturing arts will appreciate that a preferred cross sectional shape of the dowel 19 and circumscribing void 45 may be circular. Those individuals will also appreciate that other cross sectional shapes are feasible. The dowel 19 may fixedly couple by any mechanical advantage such as threads, pressure, friction, suction, epoxy, and etc. In at least one embodiment, the dowel 19 may be formed as a part of the tracker module 14 as a cohesive unit thereby eliminating the need for a dowel receptor 17. In other embodiments, the dowel 19 may be TAC welded or spot welded onto the face of the tracker module 14 by manual means or automation.

In other embodiments, the dowel 19 may completely penetrate the tracker module and have a locking assembly fixedly couple the dowel 19 by securing the dowel 19 to the rear face of the tracker module 14. For example, a cotter pin assembly. Furthermore, the dowel may have a circumscribing ring of greater cross sectional thickness at one end so that the one end may not pass through the circumscribing void. Further still, in other embodiments a connection point 20 (see FIG. 3A) may have a similar arrangement as the dowel 19 and dowel receptor 17 consistent with the numerous contemplated embodiments of this disclosure.

Figure 5B:
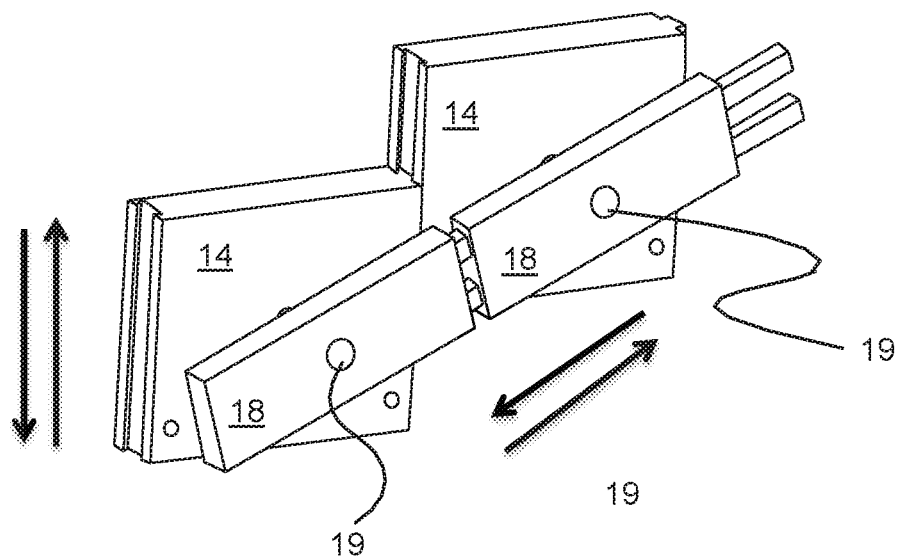
FIG. 5B is an operable assembly of a tracker module and base bar relationship, consistent with disclosed embodiments.

FIG. 5B is an assembled tracker module 14, dowel 19, and base bar 18. The figure is consistent with the exploded-view illustration of FIG. 5A and illustrates the respective directions of motion of the tracker modules 14 to the base bars 18. In FIG. 5B, the left-most pair of arrows illustrates the direction of motion of the tracker modules 14 in respect to one another. Likewise, in FIG. 5B, the right-most pair of arrows illustrates the direction of motion of the base bars 18 in respect to one another. FIG. 5A and FIG. 5B together show how lateral forces may be transferred between the tracker modules 14 and base bars 18 while rotational motion may not be transferred.

In the exemplary embodiment of FIGS. 5A and 5B the dowel 19 may transfer lateral forces from the base bar 18 to the tracker module 14 and vice versa. Moreover, the dowel 19 will not transfer rotational forces from the base bar 18 to the tracker module 14 or vice versa because it is freely circumscribed by the circumscribing void 45 and has no fixed point of attachment to the base bar 18.

Figure 6:
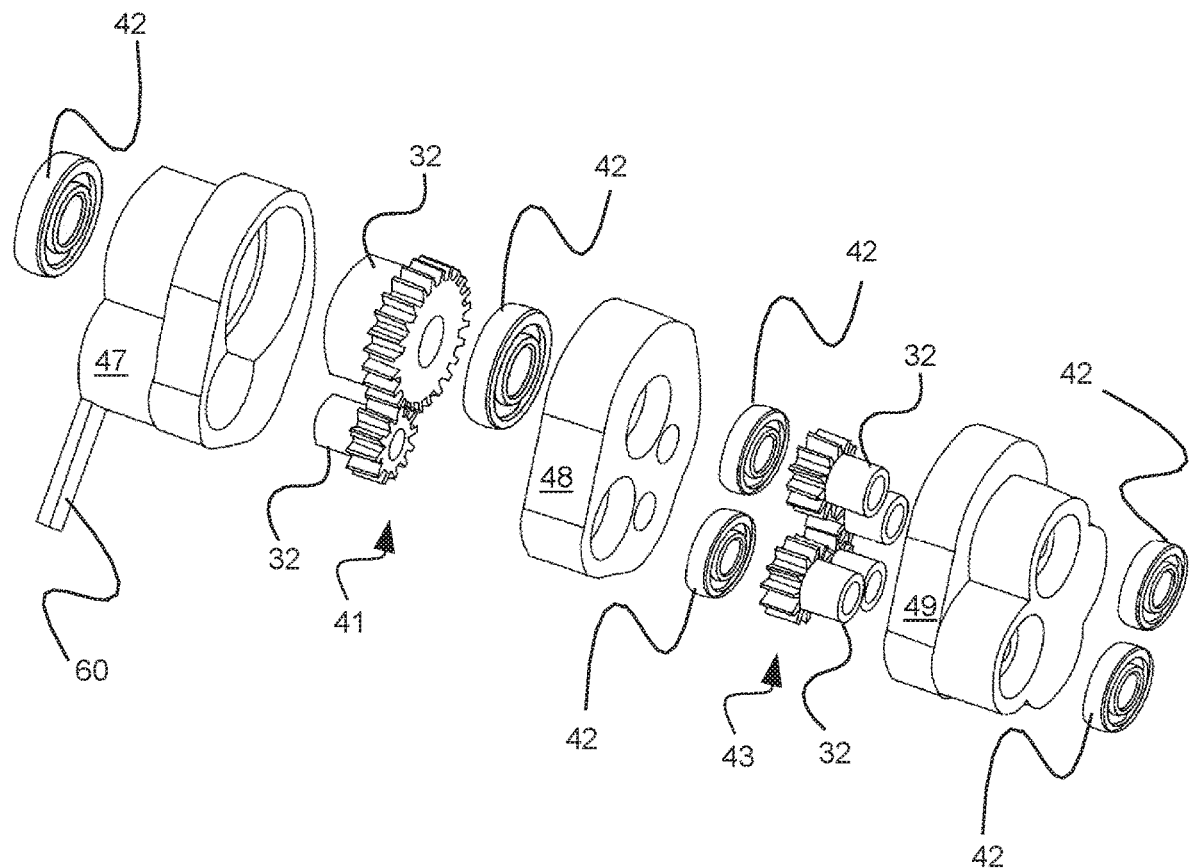
FIG. 6 is a partial exploded-view of a transmission, consistent with disclosed embodiments.

Referring now to FIG. 6 is a partial exploded-view of an exemplary transmission 33, consistent with disclosed embodiments. In the exemplary embodiment of FIG. 6, the transmission 33 has two operable gearsets 41 and 43. As illustrated, the base bar gearset 41, has two gears and the tracker module gearset 43 has four gears. At least some of the gears of the base bar gearset 41 and tracker module gearset 43 have connection hardware 32. However, not all gears may have connection points and other gears may not require connection points as the gear may be part of a unitary shaft.

In the exemplary embodiment of FIG. 6, connection hardware 32 is a cup like shape sized for receiving a shaft with a circular cross section. Base bar gearset 41 has one large and one small gear. The small gear may be the first gear and the large gear may be the final gear of the base bar gearset 41. Tracker module gearset 43 has four gears in similar sizes to one another. The bottom right gear may be the first gear and the top right gear may be the final gear of tracker module gearset 43. In other embodiments, the gearsets 41 and 43 may have differing numbers, orientation, and sizing of gears and connection hardware 32. The base bar gearset 41 and tracker module gearset 43 may, at least partially, be retained within a series of transmission housing elements 47, 48, and 49. Numerous bearings 42 may also be retained within the series of transmission housing elements 47, 48, and 49. Bearings 42 may reduce friction, wear and tear, and temperature of the transmission 33. Further, the transmission 33 may have an outer cover 36 (see FIG. 2), which is not shown here for ease of understanding of the transmissions 33 inner workings.

Transmission housing elements 47, 48, and 49 may be oversized to allow customization of base bar gearset 41 and tracker module gearset 43. Likewise, the outer cover 36 (see FIG. 2) may be oversized. Furthermore, they may be spaced apart such that the teeth of gearsets 41 and 43 are not circumscribed. Moreover, in at least one embodiment, transmission 33 has an oversized outer cover 36 (see FIG. 2), oversized transmission housing elements 47, 48, and 49, operably sized to accommodate multiple sizes of gearsets 41 and 43. The gearsets 41 and 43 may quickly and easily be interchanged by an end user.

Figure 7:
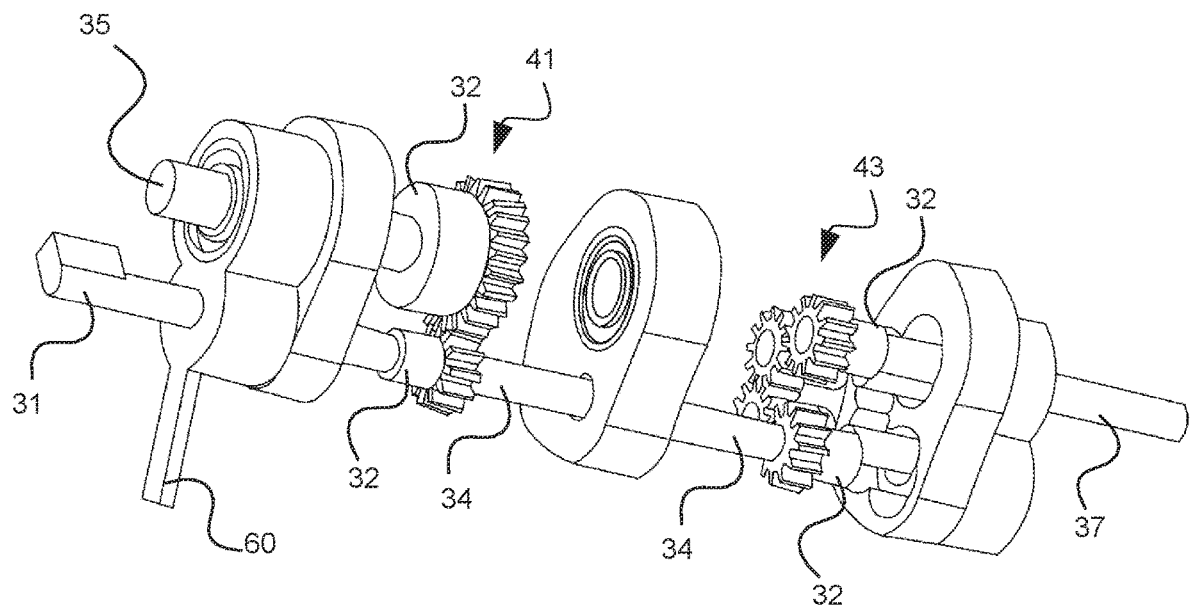
FIG. 7 is a partially assembled view of a transmission, consistent with disclosed embodiments.

Referring now to FIG. 7, is a partially assembled view of an exemplary transmission 33, consistent with disclosed embodiments. In the exemplary embodiment of FIG. 7, the transmission 33 is operably attached to a power input shaft 31. The transmission 33 may be fixed in place by transmission mount 60. Transmission mount 60 may be sized to resist the full rotational force of the transmission 33. The power input shaft may in turn be operably attached to a motor and the connection hardware 32 of a gear of the base bar gearset 41. The base bar gearset 41 may be operably attached to a transmission drive shaft 34, the power input shaft 31, and the powered base bar output shaft 35.

As illustrated in FIG. 7, the large gear (final gear) of the base bar gearset 41 is operably attached to a powered base bar output shaft 35 by connection hardware 32. The transmission drive shaft 34 is operably attached to tracker module gearset 43 and the base bar gearset 41. A fourth gear (final gear) of the tracker module gearset 43 is operably attached to a powered tracker module output shaft 37.

In exemplary FIG. 7, rotational power may enter the transmission 33 by way of the power input shaft 31. The power input shaft 31 may power a first gear of the base bar gearset 41 and the tracker module gearset 43 simultaneously with the assistance of the transmission drive shaft 34 In this way, a single input power source can power two different output power sources by way of the transmission 33. In other exemplary embodiments the power input shaft 31 and the transmission drive shaft 34 may be a unitary shaft with two discrete portions 31 and 34 that are one single piece.

In the exemplary embodiment of FIG. 7, the base bar gearset 41 and tracker module gearset 43 have differing numbers, sizes, and teeth of gears. This difference causes the powered base bar output shaft 35 and powered tracker module output shaft 37 to have different output rotational speeds notwithstanding that they both have the same input rotational speed.

For example, by making the teeth number of the final gear of the base bar gearset attached to the power input shaft 31 "m" times greater than the gear attached to the powered base bar output shaft 35, the angular speed of the powered base bar output shaft 35 will be reduced to (1/m) of the angular speed w of the power input shaft 31. Analogously, the angular speed of the tracker module output shaft can be increased or reduced by adjusting the ratio of gear teeth. In this way, the transmission 33 may distribute a single input rotational power to two output shafts with differing angular speeds. Moreover, in this way the transmission may be quickly and easily modified to deliver a range of output angular speeds because of the customizability of the transmission 33.

Figure 8:
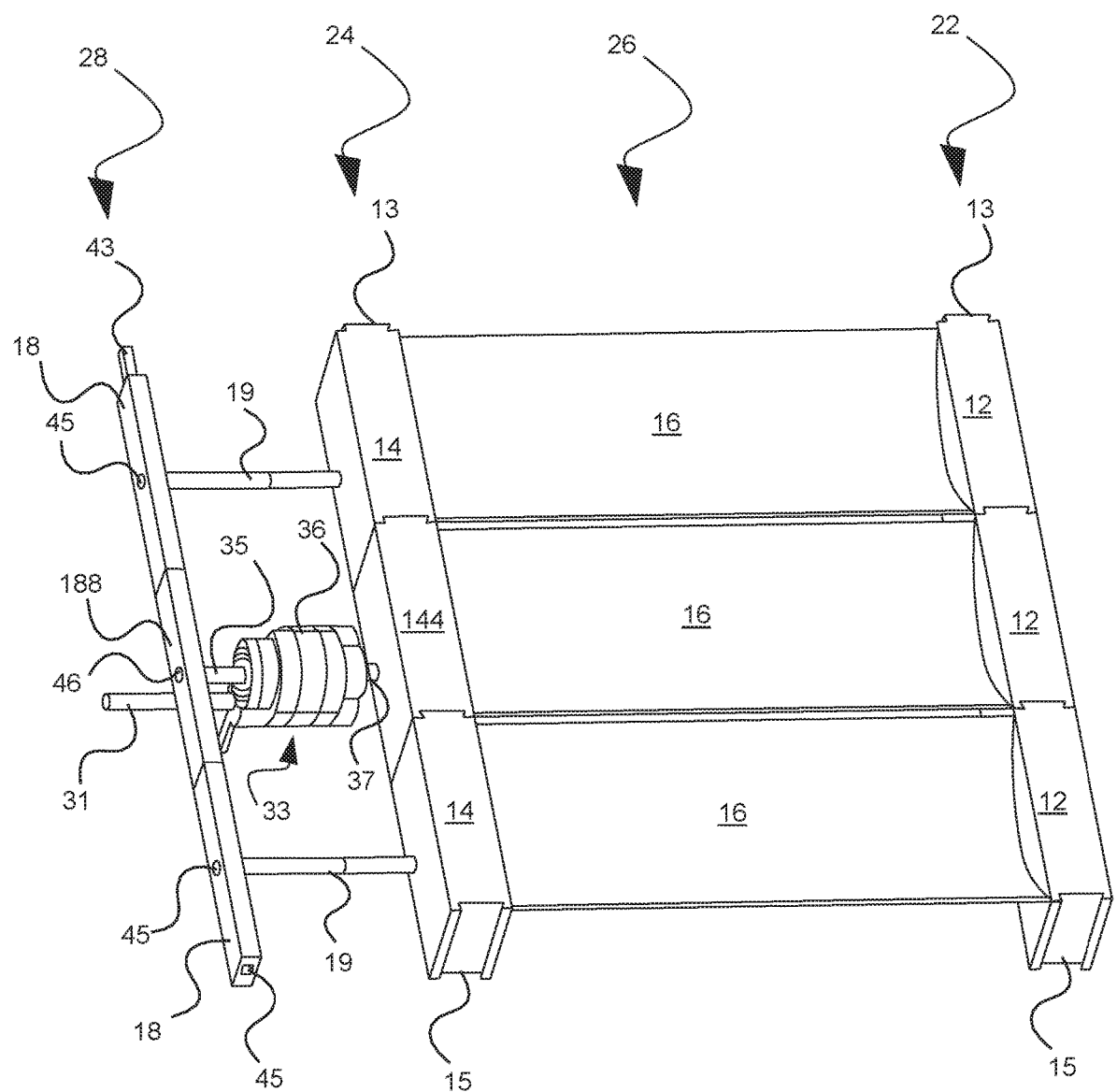
FIG. 8 is a profile view of a solar tracking system, consistent with disclosed embodiments.

Referring now to FIG. 8, is a profile view of a solar tracking system 11, consistent with disclosed embodiments. In the exemplary embodiment of FIG. 8, rotational power enters the transmission 33 by the power input shaft 31. The transmission 33 distributes the power to base bar output shaft 35 and tracker module output shaft 37. Tracker module output shaft 37 is fixedly coupled to powered tracker module 144 and base bar output shaft 35 is fixedly coupled to powered base bar 188 at a fixed base bar connection 46. Powered base bar 188 distributes rotational power to adjacent base bars 18 with the assistance of receiving fitment features 43 and protruding fitment features 41. In this way, the base bar array 28 may receive rotational power from the base bar output shaft 35. Moreover, a group of base bars 18 may rotate in unison by way of a base bar array 28.

Powered tracker module 144 and opposing tracker module 12 together form a tracker module pair. Further, powered tracker module 144 and opposing tracker module 12 are fixedly attached by at least one linking rod 103 (see FIG. 1A) beneath the corresponding sandwiched solar concentrator 16. Powered tracker module 144 distributes rotational power to adjacent tracker modules 14 with the assistance of protruding fitment features 13 and receiving fitment features 15. Further, powered tracker module 144 distributes rotational power to opposing tracker module 12 by at least one linking rod 103 (see FIG. 1A). In this way, the first tracker module array 22 and the second tracker module array 24 are powered by the powered tracker module 144. Moreover, a first and second tracker module array 22 and 24, may rotate in unison with one another. Stated another way, a group of tracker modules 14 may rotate in unison by way of a tracker module pair array.

In the exemplary embodiment of FIG. 8, the base bar array 28 may rotate independently of the second tracker module array 24 because the dowels 19 are not fixed to base bars 18. The base bar array 28 and first tracker module array 24 may transfer, at least marginally, lateral force by way of the circumscribing voids 45 and dowels 19 because the dowels 19 are fixedly coupled to tracker modules 14 and freely circumscribed by circumscribing voids 45.

Moreover, the rotation of the first and second tracker module arrays 22 and 24 may rotate at a different angular speed than the base bar array 28. This is possible for at least three significant reasons. First, the base bar output shaft 35 and the tracker module output shaft 37 revolve at different angular speeds. Second, the base bar array 43 and the second tracker module array 24 are not fixedly coupled. Third, fitment features 43 and 45 of the base bar array 28 and the fitment features 13 and 15 of the first and second tracker module arrays 22 and 24 are operably designed to allow relative motion. However, these reasons should not imply that the base bar array 28 and the first and second tracker module arrays 22 and 24 rotate wholly independently of one another as the base bar array 28 provides support for and constrains the second tracker modules with dowels 19 that are retained within circumscribing voids 45 of base bars 18. Therefore, the base bar array 28 and the first and second tracker modules arrays 22 and 24 rotate independently of one another but in relation to and in conjunction with one another.

Figure 9:
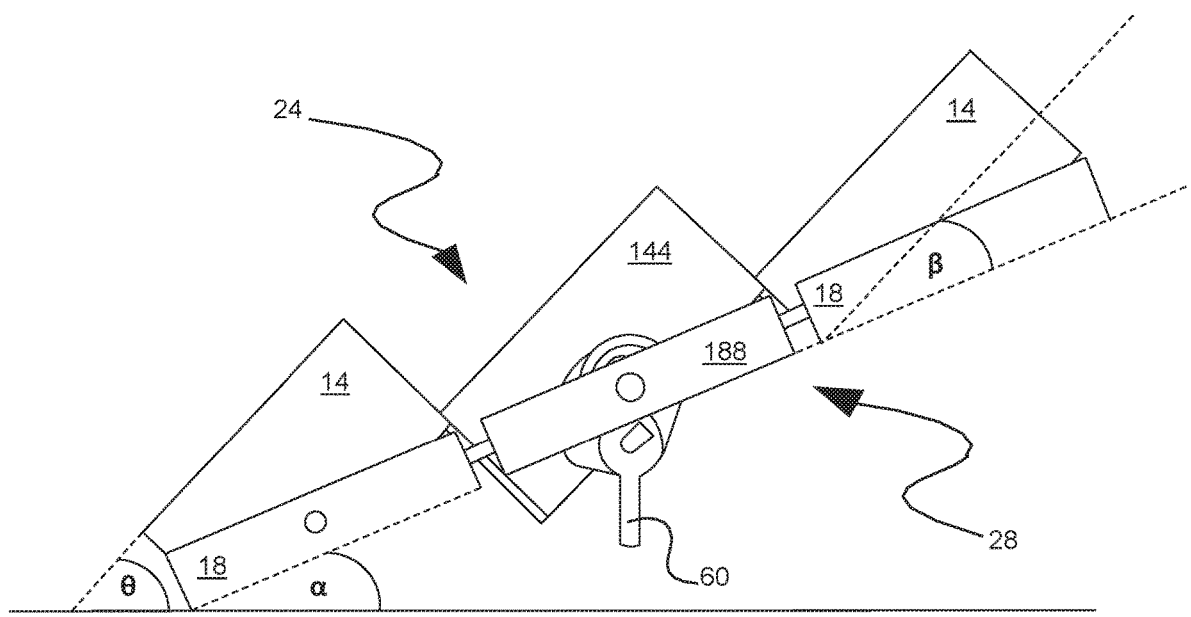
FIG. 9 is a profile view of a solar tracking system, consistent with disclosed embodiments.

FIG. 9 is a profile view of a solar tracking system, consistent with disclosed embodiments. In the exemplary embodiment of FIG. 9, an angular relationship between the second tracker module array 24 and the base bar array 28 may be illustrated. The angle of the base bar array 28 with the horizontal is defined by $\alpha$, the angle of the second tracker module array 24 with the horizontal is defined by $\theta$, and the angle of the second tracker module array 24 with the base bar array 28 is defined by $\beta$.

$\theta$ may also represent the angle of first tracker module array 22 (see FIG. 8) and the corresponding solar concentrators 16 (see FIG. 8) with the horizontal. Therefore, $\theta$ may be the critical angle, the target angle of alignment and may be referred to as the tracking angle of a solar tracking system. The solar tracking angle for a solar tracking system may be, "the angle between the tracker surface and the horizontal plane", which is $\theta$ in this case. $\beta$ may be the relative rotation angle of the tracker module array 24 with the base bar array 28. In FIG. 9, the base bar array rotates $\alpha$, and then the total tracking angle becomes $\theta$ because an additional relative angle $\beta$ has rotated.

In the exemplary embodiment of FIG. 9, the rotational speed of the base bar array 28 is less than the rotational speed of the first and second tracker module arrays 22 and 24. Therefore, in the embodiment of FIG. 9, when the base bar array 28 rotates $\alpha$, the second tracker module array 24 has already rotated an angle $\theta$ which is greater than $\alpha$. Furthermore, during the rotation process, the base bar array 28, partially constrains the second tracker module array 24 causing individual tracker modules 14 and 144 to slide up and down relative to one another and base bars 18 and 188 to move away and toward one another.

The constant relative motion of the individual base bars and tracker modules in conjunction with the rotational motion of the tracker module arrays and base bar arrays results in the tracking angle $\beta$ having a large angular range. This is in large part due to the difference between the base bar array 28 rotation angle $\alpha$ and the second tracker module array 24 rotation angle $\theta$. The angular range of tracking angle $\beta$ is greater than that which could be accomplished by a rotation of a single board array.

For example, if the solar tracking system had a single array of solar panels of equal length of the base bar array 28, than the maximum critical tracking angle would be $\alpha$. However, with a base bar array 28 and first and second tracker module arrays 22 and 24 a significantly greater maximum critical tracking angle of $\alpha+\beta$ is achieved.

Therefore, the solar tracking system 11 may have a smaller occupancy volume when compared to tracking methods of singular arrays. This is important because a reduction in occupancy volume can in turn reduce the cost of electrical generation and increase the number of applicable installation locations.

Figure 10A:
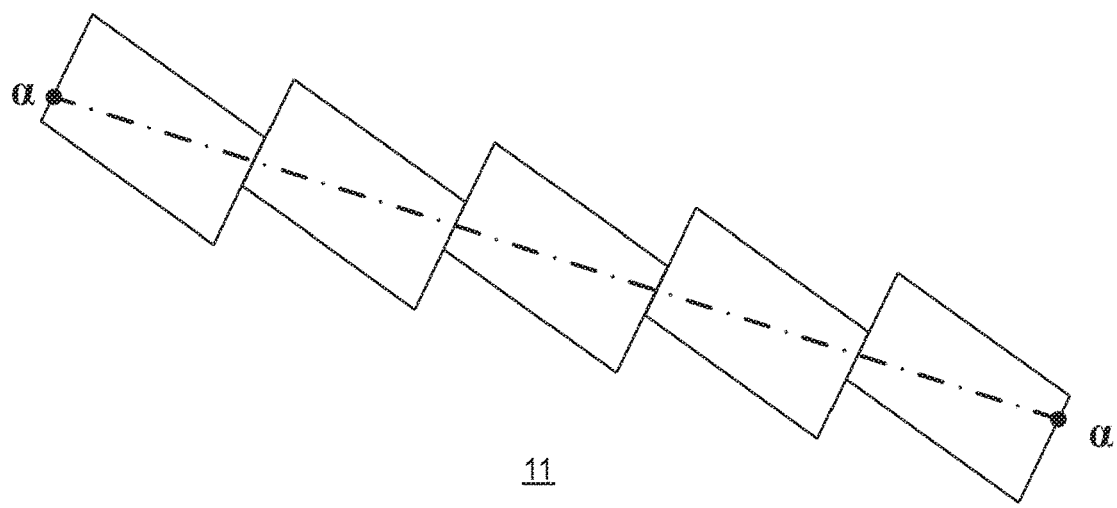
FIGS. 10A-10C are elevation views of angular orientations of a solar tracking system, consistent with disclosed embodiments.
Figure 10B:
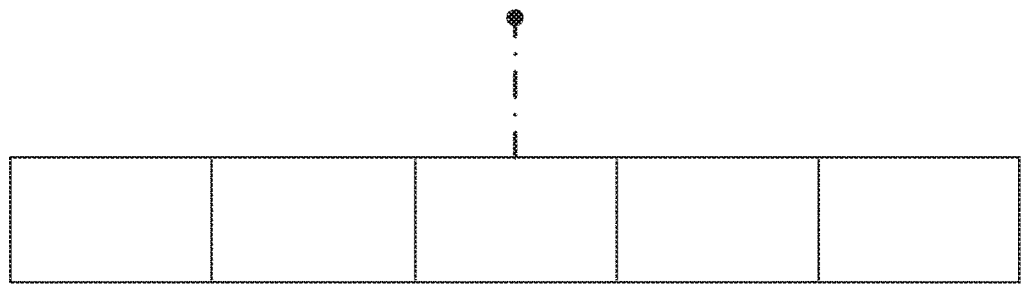
Figure 10C:
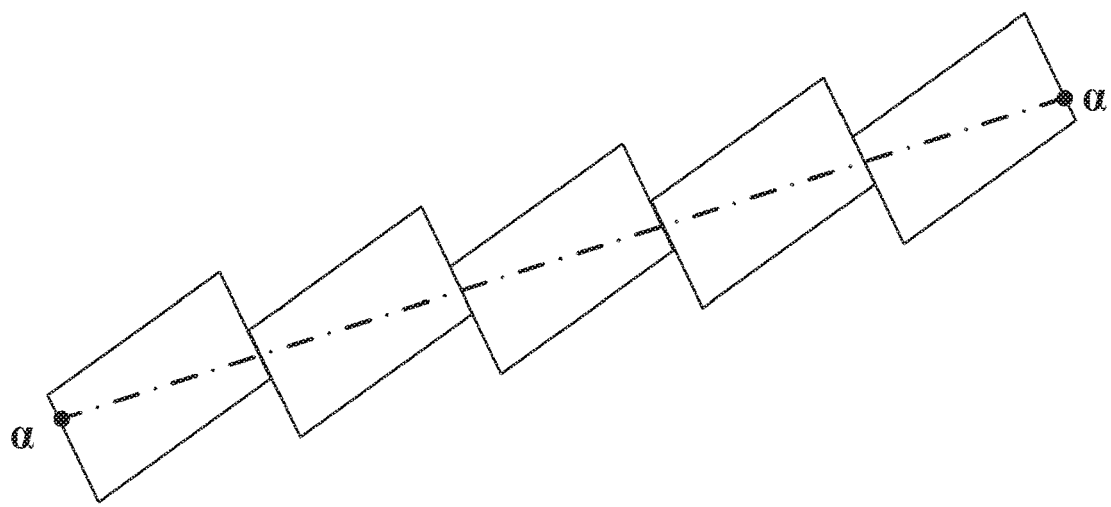

Referring now to FIGS. 10A-10C are elevation views of angular orientations of a solar tracking system 10, consistent with disclosed embodiments. The squares of each figure illustrate a tracker module. FIG. 10A illustrates a first position of a solar tracking system 11 which may represent a farthest position the solar tracking system 11 can rotate to the right. The dashed line along a may represent the farthest position a single array system of equal length to the solar tracking system 11 can rotate. FIG. 10B illustrates a second intermediate position of a solar tracking system 11. FIG. 10C illustrates a third position of a solar tracking system 11 which may represent a farthest position the solar tracking system 11 can rotate to the left. The dashed line along a may represent the farthest position a single array system of equal length to the solar tracking system 11 can rotate. The series of FIGS. 10A-10C illustrate that a single array system of equal length to a solar tracking system 11 has a smaller critical tracking angle.

Figure 11A:
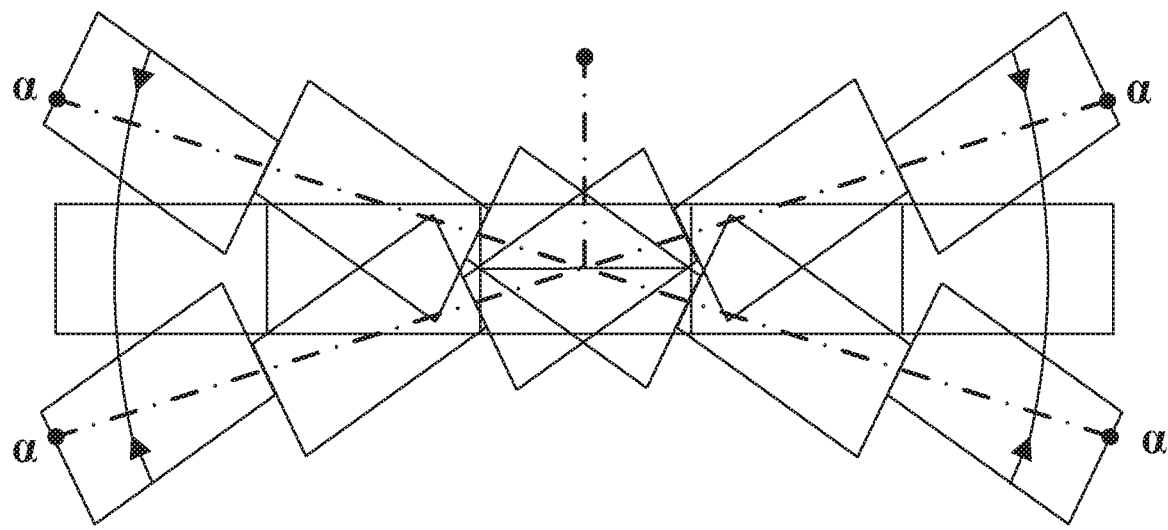
FIG. 11A is an elevation view overlay of the angular orientations of FIGS. 10A-10C, consistent with disclosed embodiments.

Referring now to FIG. 11A, an elevation view of three overlays representing the angular orientations of FIGS. 10A-10C is illustrated. FIG. 11A illustrates that for any certain maximum angular range; the occupancy volume of the solar tracking system 11 may be reduced compared to conventional single board designs. Stated another way, a single board design must have more space, and a larger footprint, to be able to turn a sufficient amount to have an equal angular range to a solar tracking system 11.

Figure 11B:
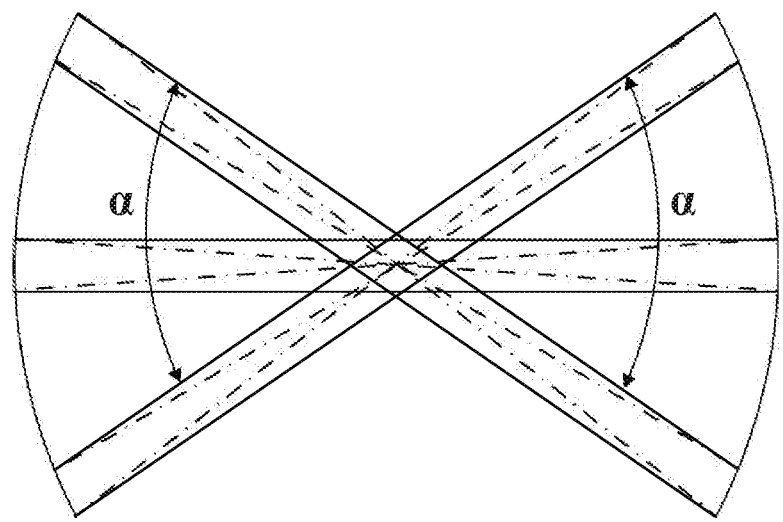
FIG. 11B is an elevation view overlay of angular orientations of single board solar tracking systems.

Referring now to FIG. 11B, is an elevation view representing the maximum angular orientations of a single board design. As FIG. 11B illustrates, for any maximum angular range; the occupancy volume of a single board tracking system must be increased compared to the solar tracking system 11 of FIG. 11A.

Referring to FIGS. 11A and 11B, an elevation view of a solar tracking system 11 and a single board tracking system are compared. As is readily apparent, the unique way that tracker modules move relative to one another causes the solar tracking system 11 of FIG. 11A to have a greater maximum angular range when compared to a single board design of the same occupancy volume.

Figure 12:
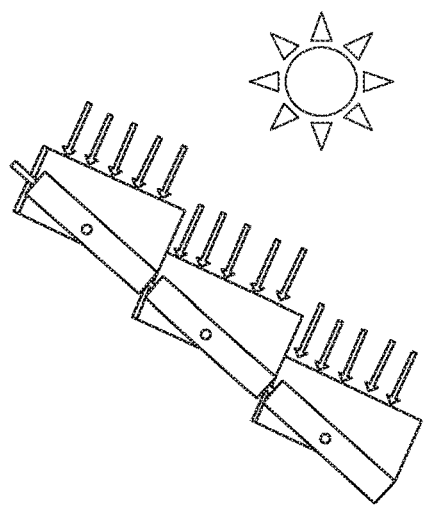
FIGS. 12A-12C are elevation views of angular orientations of a solar tracking system, consistent with disclosed embodiments.
Figure 12:
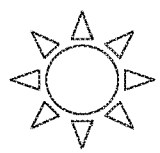
Figure 12:
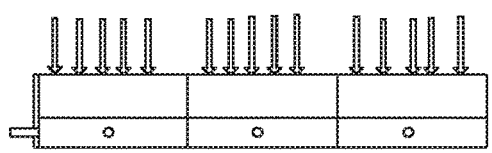
Figure 12:
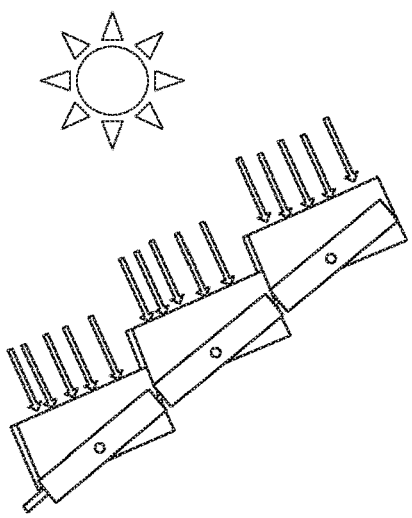

Referring to the Figures generally and FIGS. 12A-12C with specificity elevation views of angular orientations of a solar tracking system, consistent with disclosed embodiments, may be discussed. FIGS. 12A-12C may illustrate that the system has no shadow effect. This means that solar cells, concentrators, and adjacent tracker modules will not block or be blocked by shadows. As is readily apparent when viewing FIG. 11B in conjunction with FIGS. 12A-12C, normal "single board designs" cause significant shadowing on adjacent neighboring elements.

FIG. 12A may illustrate a first position in orientation with the sun just before sunrise. FIG. 12B may illustrate a second position in orientation with the sun at high noon. FIG. 12C may illustrate a third position in orientation with the sun just before sunset. FIGS. 12A-12C may illustrate a range of motion of a solar tracking system 11 and the operability of the base bar array 28 and tracker module array 24.

While illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. It is intended, therefore, that the specification and examples be considered as exemplary only, with a true scope and spirit being indicated by the following claims and their full scope of equivalents.

What is claimed is:

1. A solar tracking system comprising:
a first tracker module array and a second tracker module array wherein the first tracker module array and second tracker module array are opposite one another, aligned in substantially identical orientation, and form a tracker module pair array comprising a plurality of interlinked tracker module pairs;
a plurality of solar concentrators wherein at least one solar concentrator is attached to and disposed between at least one tracker module pair;
a base bar array coupled to one of the tracker module arrays wherein the base bar array comprises a plurality of interlinked base bars; and
a transmission coupled to the base bar array and one of the tracker module arrays;
wherein the first and second tracker module arrays and the base bar array are configured to rotate around parallel axes at different angular speeds such that when the base bar array rotates an angle $\alpha$ relative to horizontal, the first and second tracker module arrays rotate a related angle $\theta$ relative to horizontal, wherein:

(i) $\theta > \alpha$ when $\alpha > 0$; and
(ii) $\theta = \alpha + \beta$;
wherein $\alpha$ is the angle of the base bar array with the horizontal, $\theta$ is the angle of the first and second tracker module arrays with the horizontal, and $\beta$ is the angle of the first and second tracker module arrays with the base bar array.

2. The solar tracking system of claim 1, wherein each tracker module pair of the tracker module pair array is operably coupled to an adjacent tracker module pair of the tracker module pair array by a plurality of fitment features.

3. The solar tracking system of claim 2, wherein the fitment features are protruding and receiving fitment features.

4. The solar tracking system of claim 1, wherein each base bar of the base bar array is operably coupled to an adjacent base bar of the base bar array by a plurality of fitment features.

5. The solar tracking system of claim 2, wherein the fitment features facilitate relative motion of adjacent tracker module pairs in a parallel direction to the major axis of the fitment features.

6. A solar tracking system comprising:
a tracker module pair array comprising a plurality of interlinked tracker module pairs;
wherein at least one tracker module pair has a dowel with a fixed end attached to it and a free end opposite the fixed end; and
wherein each tracker module pair is in contact with at least one adjacent tracker module pair by a plurality of fitment features;
wherein the fitment features maintain tracker module pairs at substantially identical orientation; and
wherein the fitment features allow adjacent tracker module pairs to move relative to one another;
an array of parabolic concentrators wherein each parabolic concentrator is disposed between a tracker module pair;
a base bar array comprising;
a plurality of interlinked base bars;
at least one circumscribing void; and
wherein a free end of the dowel is enveloped by the at least one circumscribing void; and
a transmission, operably coupled to the base bar array and the tracker module pair arrays;
wherein the tracker module pair array and the base bar array are configured to rotate around parallel axes at different angular speeds such that when the base bar array rotates an angle $\alpha$ relative to horizontal, the tracker module pair array rotates a related angle $\theta$ relative to horizontal, wherein:

(i) $\theta > \alpha$ when $\alpha > 0$; and
(ii) $\theta = \alpha + \beta$;
wherein $\alpha$ is the angle of the base bar array with the horizontal, $\theta$ is the angle of the first and second tracker module arrays with the horizontal, and $\beta$ is the angle of the first and second tracker module arrays with the base bar array.

7. The solar tracking system of claim 3, wherein the transmission further comprises:
a power input shaft;
a base bar gearset and a base bar output shaft operably coupled to the base bar array; and
a tracker module gearset and a tracker module output shaft operably coupled to the tracker module pair array.

8. A solar tracking system comprising:
a row of first tracker modules and a row of second tracker modules;
wherein successive tracker modules of the row of first tracker modules and successive tracker modules of the row of second tracker modules form an array of tracker module pairs;
wherein each tracker module pair is in contact with at least one adjacent tracker module pair by a plurality of fitment features;
wherein the fitment features maintain the tracker module pairs at substantially identical orientation;
an array of solar concentrators wherein each concentrator is disposed between a tracker module pair;
a base bar array; and
a transmission with at least two gearsets, operably coupled to the base bar array and at least one tracker module;
wherein the array of tracker module pairs and the base bar array are configured to rotate around parallel axes at different angular speeds such that when the base bar array rotates an angle $\alpha$ relative to horizontal, the array of tracker module pairs rotates a related angle $\theta$ relative to horizontal, wherein:
(i) $\theta > \alpha$ when $\alpha > 0$; and
(ii) $\theta = \alpha + \beta$;
wherein $\alpha$ is the angle of the base bar array with the horizontal, $\theta$ is the angle of the first and second tracker module arrays with the horizontal, and $\beta$ is the angle of the first and second tracker module arrays with the base bar array.

9. The solar tracking system of claim 8, wherein the base bar array comprises a plurality of interlinked base bars with circumscribing voids.

10. The solar tracking system of claim 9, wherein the plurality of interlinked base bars are maintained in substantially identical orientation.

11. The solar tracking system of claim 10, wherein at least one circumscribing void freely envelops at least one dowel fixedly connected to a tracker module.

12. The solar tracking system of claim 11, wherein the base bars are interlinked by a plurality of protruding and receiving fitment features.

13. The solar tracking system of claim 9, wherein at least three tracker module pairs are operably coupled to at least three base bars.

14. The solar tracking system of claim 13, wherein the transmission has at least two gearsets and one gearset is a base bar gearset and one gearset is a tracker module gearset.

15. The solar tracking system of claim 14, wherein the base bar gearset is operably coupled to at least one base bar and the tracker module gearset is operably coupled to at least one tracker module.

16. The solar tracking system of claim 15, wherein the transmission has at least one power input shaft operably coupled to a motor.

17. The solar tracking system of 16, wherein the transmission has at least one mounting feature.

18. The solar tracking system of claim 8, wherein at least one solar cell is placed at the focal plane of at least one solar concentrator of the solar concentrator array.

19. The solar tracking system of claim 8, wherein each solar concentrator of the solar concentrator array is parabolic.

20. The solar tracking system of claim 8, wherein the transmission is customizable.

21. The solar tracking system of claim 8, wherein the plurality of fitment features facilitate relative motion of adjacent tracker module pairs in a parallel direction to the major axis of the fitment features.

22. The solar tracking system of claim 12, wherein the plurality of fitment features facilitate relative motion of adjacent base bars in a parallel direction to the major axis of the fitment features.

23. The solar tracking system of claim 4, wherein the fitment features facilitate relative motion of adjacent base bars in a parallel direction to the major axis of the fitment features.

* * * * *